Patented Aug. 28, 1951

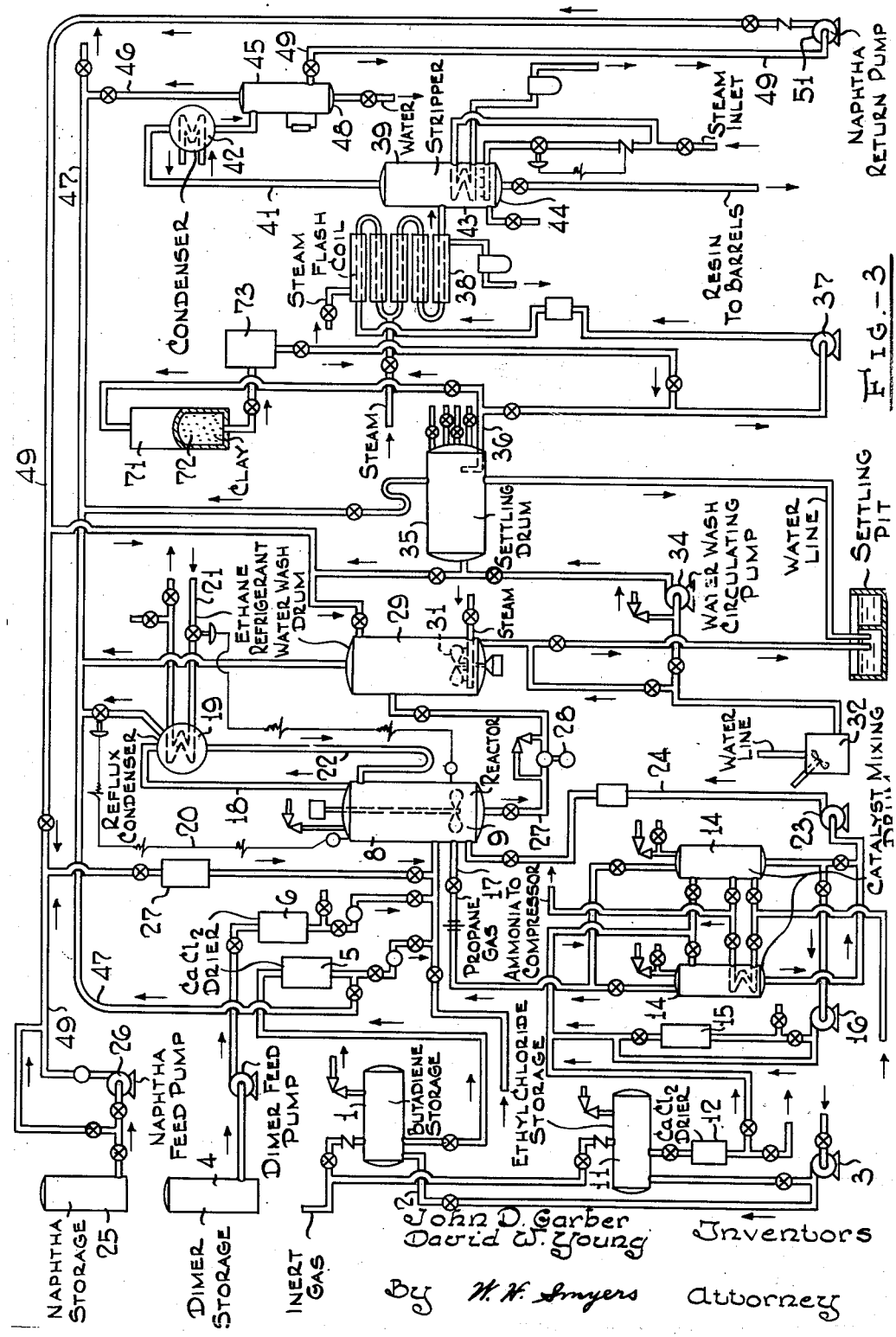

2,565,960

UNITED STATES PATENT OFFICE 2,565,960

PREPARATION OF AN IMPROVED HYDROCARBON RESIN

John D. Garber, Cranford, and David W. Young, Roselle, N. J., assignors to Standard Oil Development Company, a corporation of Delaware Application July 6, 1946, Serial No. 681,684

2 Claims. (Cl. 260—85.3)

This invention relates to olefinic polymers; relates particularly to the production of clear, light-colored polymers, of high solubility, and relates especially to means for clarifying polymer resins and removing therefrom insoluble cross-linked material.

It has been found possible to produce an extremely valuable synthetic or polymeric resin from mixtures of mono olefins and multi olefins in which mixtures there may be present from 30 percent to 80 percent of a multi olefin such as butadiene or other multi olefin having from 4 to 14 carbon atoms per molecule with the remainder of the polymerizate mixture consisting of a mono olefin having from 5 to about 20 carbon atoms, or a normal olefin having from 3 to 20 carbon atoms, by the application to the mixture of a Friedel-Crafts catalyst at temperatures ranging from about $+10°$ C. to $-30°$ C. to produce a resin which is not an elastomer but is a hard, solid, hydrocarbon-soluble substance having many of the characteristics of the natural varnish gums and resins. However, difficulty has been encountered in the production of resins of satisfactory quality, because of the unavoidable production during the polymerization of a small amount of "cross-linked" material or "gel" which is found to be insoluble in many solvents, including the paint and varnish oils and solvents. This insoluble, cross-linked gel material is objectionable for most uses to which the resin is put, since it interferes with the clarity of the finished varnish. In addition, it is objectionable in molding compositions because of the change in characteristics entailed.

It is now found that this cross-linked material can be removed from a solution of the resin by a combination of the steps of settling the resin solution to remove the larger particles of cross-linked material, and the residual traces can be filtered out by the use of filter aids, even though the particles tend to be solvated and slimy. The settling properties of the cross-linked material are most unexpected, since it is the same polymer in which several molecules are held together by cross-linkage through unsaturations and it is most unexpected that it should show a difference in specific gravity. Furthermore, while the material is insoluble, it is solvated and slimy in character, and it is most unexpected to find that the slimy solvated material could be caught on a filter.

Thus the invention polymerizes a diolefin such as butadiene in proportions from 30% to 80% with a mono olefin such as di-isobutylene in proportions from 70% to 20% at temperatures within the range between $+10°$ C. and $-30°$ C. by the application thereto (in the presence of a diluent such as liquid propane or butane, if desired) of a Friedel-Crafts catalyst such as aluminum chloride in solution in ethyl or methyl chloride or AlBr₃ in solution in hydrocarbons such as butane, hexane, or the like to yield a solution of resin in unpolymerized diolefin, mono-olefin, catalyst solvent and diluent.

After the polymerization reaction has been carried to the desired stage, the reaction mixture is washed repeatedly with water or with a very mild alkali such as a sodium bicarbonate solution and then, with further repeated washings of water, until a condition of neutrality is obtained; that is, a pH of about 7. The washed material is then passed through a settling chamber in which the last traces of water are settled out and removed, and in which a substantial amount of the cross-linked insoluble material settles into a sludge, leaving a supernatant layer of polymer solution containing considerably reduced amounts of insoluble polymer. This layer of solution is then mixed with a filter aid such as diatomaceous earth and pumped under substantial pressure through a filter press, the plates of which have been pre-coated with a layer of similar filter aid. The solution is delivered from the filter in a crystal clear condition, substantially completely free from insoluble material. The polymer is then recovered from the solution in any desired manner such as by delivery to and through a steam-jacketed Monel metal coil, as is shown in our copending application Serial No. 662,693, filed April 17, 1946, now U. S. Patent 2,507,100.

Alternatively, all of the insoluble material or gel may be filtered out without the settling step, or the gel may be removed by centrifuging, which, if properly conducted, yields a crystal clear, sparkling solution of high quality, from which the polymer is readily recovered by flashing through a steam-jacketed coil, or by vacuum treatment or by the other means. Alternatively, settling alone may be used, especially in the presence of a rapid settling filter aid. As another alternative, it is also possible to clarify the material by allowing it to percolate through a filter bed, a good grade of gel-free polymer solution being obtainable thereby. After clarification, the polymer solution is conveniently recovered by flashing through a steam-jacketed Monel metal coil or by evaporation of the solvent in vacuum at a slightly elevated temperature. Other objects and details of the invention will be apparent from the following description when read in connection with the accompanying drawings, in which:

Figure 3 is a diagrammatic representation of apparatus for the polymerization, percolation-filtration and flashing of clarified resin solution.

Figure 1:
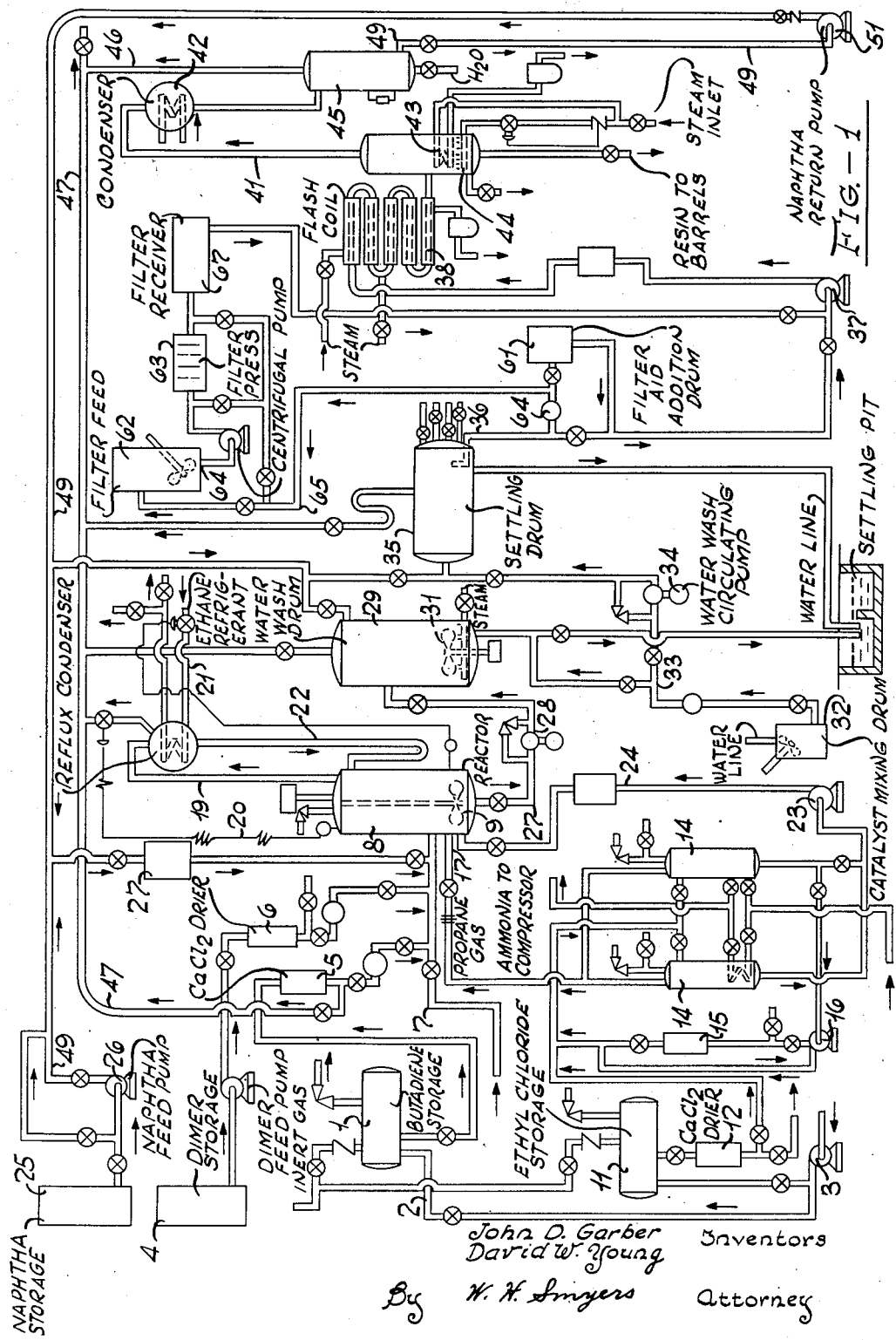
Figure 1 is a diagrammatic representation of apparatus for the polymerization, filtration, and flashing of the polymer according to the present invention.

The raw material for the present invention is a low temperature resin prepared from a multi olefin and a mono olefin. The preferred multi olefin is butadiene, but any substituted butadiene or any multi olefin having more than one double linkage is useable; including such substances as isoprene, piperylene, the several dimethyl butadienes, dimethallyl, myrcene, divinyl benzene, cyclopentadiene, hexatriene, mono vinyl acetylene, allo-ocymene, and the like, any multi olefinic substances having two or more carbon to carbon double linkages per molecule, and from 4 to 14 carbon atoms being useful.

This material is copolymerized with a mono olefin or mixtures of mono olefins such as propylene, or normal butylene; all of the pentenes, hexenes, heptenes, octenes, nonenes, and the like, up to about 20 carbon atoms being equally useful. That is, all of the normal mono olefins having from 3 to 20 carbon atoms inclusive are useful and all of the secondary and tertiary mono olefins having from 5 to 20 carbon atoms, similarly being equally useful. (Isobutylene is not useable in this reaction since its high polymerization reactivity results in the polymerization of the isobutylene with a relatively very small amount of the multi olefin, yielding a wholly different, rubbery, type of substance, or a thick oil, not a hard resin.)

The preferred mixture is from 30% to 80% of the multi olefin, preferably butadiene because of its cheapness and availability, with from 70% to 20% of di-isobutylene, also because of its cheapness and availability. These materials are mixed, diluted with an appropriate amount of a diluent such as liquid propane and polymerized by the addition of the appropriate catalyst.

Referring to the drawing, the butadiene is stored in tank 1 to which it is delivered through a pipe 2 by a pump 3, the suction of which is drawn from some such supply as a tank car. Simultaneously, the dimer is stored in a tank 4 after receipt from the refinery or other convenient source. Preparatory to use, the butadiene is passed through a calcium chloride dryer 5 and the dimer through a calcium chloride dryer 6. Both dryers discharge through a pipe 7 into the reactor 8. The reactor contains a propeller stirrer 9 which is driven by an appropriate motor (not shown). Simultaneously, a supply of ethyl chloride is stored in the container 11, to which it likewise is delivered from tank cars or other source of supply. The ethyl chloride likewise is passed through a calcium chloride dryer 12 to one or the other of mixing drums 14. From the mixing drums 14, the ethyl chloride is circulated through an aluminum chloride dissolver 15 by a pump 16 until a sufficiently strong solution of aluminum chloride is obtained in the drums 14.

In the meantime, an appropriate amount of liquid propane is delivered to the reactor 8 through a pipe line 17. The propane is volatilized by the warmth of the butadiene and dimer in the reactor 8 and passes upward through the pipe 18 to a reflux condenser 19, cooled with liquid ethylene delivered through the supply pipe 21. The reflux of cold propane flows downward through the pipe 22, back into the reactor 8. This reflux cooling is continued until the material is brought down to the desired temperature which is determined by the mixed boiling point of the contents of the reactor, the amount of propane present being brought to a value such that the mixed boiling point is at the desired temperature. It may be noted that while liquid propane is in some ways preferable, gaseous propane is useable, since after introduction, it is cooled in the reflux condenser 19 and delivered as liquid through the pipe 22 to the reactor 8. When the desired temperature is reached, the catalyst is delivered by the pump 23 through pipe 24 to the reactor 8 in the form of a fine, high-pressure jet which is very rapidly stirred into the olefin-containing mixture. The reaction proceeds promptly to yield the desired polymer resin. The rate of reaction is to a considerable extent determined by the rate of catalyst delivery, and the rate of delivery is preferably kept at a comparatively low value to avoid undue temperature rise in the reactor; that is, with a reactor containing 550 pounds of butadiene and 450 pounds of dimer dissolved in approximately 700 pounds of propane, approximately 75 gallons of a 3% aluminum chloride solution in ethyl chloride are required for conversion of approximately 75% of the olefinic material; and this amount of catalyst is delivered over a time interval of approximately 1 to 2 hours. When the reaction has reached the desired stage, a supply of light naphtha from the storage tank 25 is delivered by a pump 26 through a calcium chloride dryer 27 to the reactor 8 where it is well stirred in by the stirrer 9. When a solution of the desired concentration has been obtained by this means, a valve in the pipe 27 is opened and the pump 28 drains the solution of polymer from the reactor 9 and delivers it to a wash tank 29 equipped with a stirrer 31. Simultaneously, water from a tank 32 is delivered through pipe 33 to the washer 29. The wash water is at a temperature considerably above the temperature of the polymerizate solution, and considerably above the boiling point of the ethyl chloride, the unreacted butadiene, and the propane. Accordingly, these components of the reaction mixture are volatilized out and discharged through an outlet pipe from the washer 29, whereafter, they may be recovered, recycled and reused in subsequent polymerizations.

The pump 34 serves to circulate the wash water and polymer solution to obtain as complete a washing as possible; at intervals the stirrer 31 is allowed to stop and the wash water or wash solution is drained off and replaced by fresh water.

When the material has been washed sufficiently and has reached a condition of neutrality utilizing from 5 to 11 or 12 successive washes, the polymer solution is transferred to the clarifying system.

In the preferred embodiment, this consists of a settling drum 35 to which the polymer solution is pumped. In this drum the last traces of water settle out and can be drained to the sewer. Simultaneously, the gel settles towards the bottom. This settling is comparatively slow and in a system having a height of 10 feet, 96% of the gel will settle into the bottom 10 inches of the drum in approximately 30 hours. The settling is of course a function of both the time and the density of the gel and simple settling beyond 80 hours usually does not yield sufficient additional clarification to justify additional settling. When the settling has proceeded to about this stage, the upper portion, the supernatant layer, is decanted off and transferred to a receiver 61. In this receiver, approximately one pound of filter aid such as a diatomaceous earth, sold as "Hyflow Super-Cell," per five gallons of polymer solution is mixed in and very thoroughly and homogeneously stirred.

Simultaneously in drum 62 a quantity of the same filter aid is stirred up into a suspension in light naphtha. A filter press 63 is provided and pumps 64 and 64' for delivering liquids thereto. The filter press is conveniently clothed with fine-textured canvas or with double layers of blotting paper since single layers appear to lack sufficient strength for the pressure necessary. The suspension of filter aid is pumped into the filter press first to establish a pre-coat on the leaves of the press. When most of the suspension has been delivered to the filter press, the valves in the suction lines are changed, and the polymer solution containing the filter aid is delivered to the filter press under sufficient pressure to force it through the press. This pressure ranges between 40 pounds and 100 pounds per square inch, being considerably less at the beginning of a filtration than it is when the filtration has been carried to the stage where the amount of filter aid on the press plates is considerable. The clarified solution is then delivered to a receiving drum 67, to which the pump 37 is connected and the clear polymer solution is delivered by the pump 37 through a non-ferrous steam-jacketed pipe system 38.

This system consists of an inner pipe made of a non-ferrous material such as Monel metal or nichrome or copper, or the like, or is glass lined and is surrounded by a jacket of high pressure steam at from 105 to 250 pounds per square inch pressure. The polymer solution delivered by the pump 37 into the inner pipe is rapidly heated to a temperature above the melting point of the resin, usually far enough above the melting point to leave the resin in a relatively fluid form, and, accordingly, the rate of passage is quite rapid. To facilitate complete removal of solvents from the resin, a stream of super-heated steam or inert gas is introduced into the coil at a point where the temperature of the resin mass is above 212° F. (usually about midway of the length of the coil); this point being chosen in order that the temperature may be above the condensation point of water.

The steam serves as a stripping agent to carry forward and away as much as possible of the light naphtha. Instead of steam, such substances as nitrogen, carbon dioxide, clean flue gas, or other inert gaseous material which shows a low solubility in the polymer may be used.

It may be noted that even the best of Monel and nichrome alloys will contain from 2 to 6 or 7% iron, and some of this iron is unavoidably absorbed by the resin. However, if the time of passage of the hot resin through the heater tube is less than four or five minutes, the amount of iron picked up by the hot resin is less than about 10 parts per million, which does not cause a serious amount of discoloration.

From the exit end of the Monel pipe, the resin is discharged to a disengaging drum 39 in which the molten resin is separated from the non-polymerized material at a temperature of approximately 280° F. From the drum 39 any residual, unpolymerized dimer and light naphtha added to the polymerizer to dilute the solution are driven off through the pipe 41 to the condenser 42. Simultaneously, the temperature in the receiver 39 is maintained by a steam coil 43 and by open steam from a distributor 44. In the condenser 42, the water, the dimer, and the added naphtha are condensed and delivered to a receiver 45. The water is drained out through a pipe 48 and sent to the sewer, and the naphtha, with small amounts of dimer, and so on, is drained out through the pipe 49 and returned by the pump 51 to the naphtha storage.

In the recovery of this copolymer resin it is essential that a relatively narrow range of conditions of temperature and throughput through the coil must be obtained and these values are critical; thus, if the rate of flow of the resin solution through the coil is too low, or the temperature is too low, the contact time is unduly long and the final resin is greenish in color or a dark brown, and not satisfactory for the manufacture of light-colored paints and varnishes; and if the rate of flow is too high incomplete separation occurs. Accordingly, the rate of flow and temperature must be adjusted according to the diameter and length of the pipe through which the resin solution flows so that time is long enough and temperature high enough to free the solution from volatile components, and the rate of flow is fast enough and the temperature low enough to prevent the contamination with iron to an extent sufficient to discolor the resin. In the embodiment herein, as above described, a Monel metal coil having a diameter of 1 inch and a length of 40 feet was used, surrounded with a steam jacket at a pressure of 105 lbs. per square inch.

In the device and process above described, a substantial amount of light naphtha diluent is delivered directly to the polymerizer, but with the reflux condenser attached, the temperature does not rise above the boiling point of the lower-boiling components, and accordingly, a very fluid solution is delivered by the pump 28 to the washer 29. This method of operation is, however, not necessary. Instead, the pipe 18 leading to the reflux condenser may be closed by a valve before the naphtha is introduced, and the naphtha may be warmed substantially before being introduced. Under these circumstances, the light volatiles may be discharged through a pipe 20 leading from the top of the reactor to a recovery and recycle system (not shown) by which the butadiene, the ethyl chloride, and the propane are separated by a fractional distillation and stored in proper storage tanks for reuse. By this procedure, a somewhat heavier, more viscous solution is delivered by the pump 28 to the washer 29, and substantially no light volatiles are disengaged in the washer. This procedure has some points of value in that it permits of recovery and reuse of many of the components; on the other hand, the cost of equipment and power for the fractional distillation may, in some instances, amount to more than the value of the recovered materials.

In some instances it is desirable to add to the resin various auxiliary substances such as other types of resins or coloring bodies, such as oil soluble dyes, pigments, and the like. Such materials are readily added with the naphtha above described; including such substances as natural rubber (Caoutchouc), isobutylenic polymers generally, the various diolefinic co-polymers, styrene, either as a monomer or polymer, the co-polymers of styrene with isobutylene, the various allyl resins, the various phthalate resins, the various phenol-formaldehyde resins, and the like. Being added in solution, these resins are introduced in a very homogeneous mixture into the final product.

It is of interest to note the surprising power of iron to degrade the color of this hydrocarbon type resin. The resin is wholly free from acid substituents and should be wholly non-corrosive. Nevertheless, at high temperatures, its attraction for traces of iron is phenomenally and unexpectedly high, to such an extent that it cannot be processed readily in iron equipment, even stainless steel, without a serious or fatal contamination by iron which, in amounts above about 100 parts per million, yields a deep yellow color, and, in amounts above 1000 parts per million, yields a brown, opaque resin. Accordingly, the process of the present invention washes out the iron, aluminum and similar material as carefully as possible to bring the resin solution to a closely neutral condition, and then removes the solvent by a heat treatment in the absence of ferrous structures to maintain as low an iron content as possible.

EXAMPLE 1

A mixture consisting of 55 parts of butadiene with 45 parts of di-isobutylene was polymerized as above outlined in the presence of appropriate diluent, and delivered to the drum 35 along with a suitable amount of an appropriate light solvent naphtha. The mixture was allowed to settle, as above outlined, for approximately 12 hours, during which time residual traces of water settled out and a considerable portion of the insoluble cross-linked gel settled to the bottom. The partially clarified supernatant liquid was then drawn off by the pump 64 and delivered to the drum 61 in which it was mixed with approximately 1 lb. of filter aid, per five gallons of resin solution. The mixture was then transferred to the drum 62 in which it was kept in continual agitation to prevent the filter aid from settling out. As a preliminary to this procedure, a substantial portion of filter aid was suspended in clear naphtha, added to the drum 61 and delivered by the pump 64 directly to the filter press 63 through the appropriate pipe connections shown by suitable adjustment of the valves. This procedure when conducted, put on the filter plates a pre-coat of filter aid. When the pre-coat was formed, the resin solution and the suspended filter aid were delivered by the pump 64' to the filter press 63 and the filtrate collected in the receiver 61, from which it was delivered by the pump 37 to the finishing coil as above outlined.

A series of runs were made without and with filter aid, and without and with filter aid pre-coat on the press leaves. In each instance, the filtration rate in gallons per hour, per square foot was determined. The results are recorded in the following Table 1:

mer solution which could be filtered through the press, the amount being increased by from 20 to 50 times by the presence of the filter aid. Discharge of the resulting filtered resin through the steam jacketed flash coil shown, resulted in an excellent resin having a Gardner color number better than eleven. It should be noted that this resin is unusually susceptible to the presence of small amounts of iron which produce a very serious discoloration. The effect of iron is well shown in the following Table 2:

Table 2

| Per Cent Fe (based on oil) | 0.01 | 0.007 | 0.005 | 0.004 | 0.003 | 0.002 | 0.001 | 0.0001 |
|---|---|---|---|---|---|---|---|---|
| Color | 17–18 | 17 | 16 | 15 | 14 | 14 | 8 | 7 |

Thus it is apparent that greater than 0.001% Fe is harmful. The fact that the resin produced by this process shows a Gardner color of 11 indicates that there is present not much more than 0.001% of iron in the finished resin.

Figure 2:
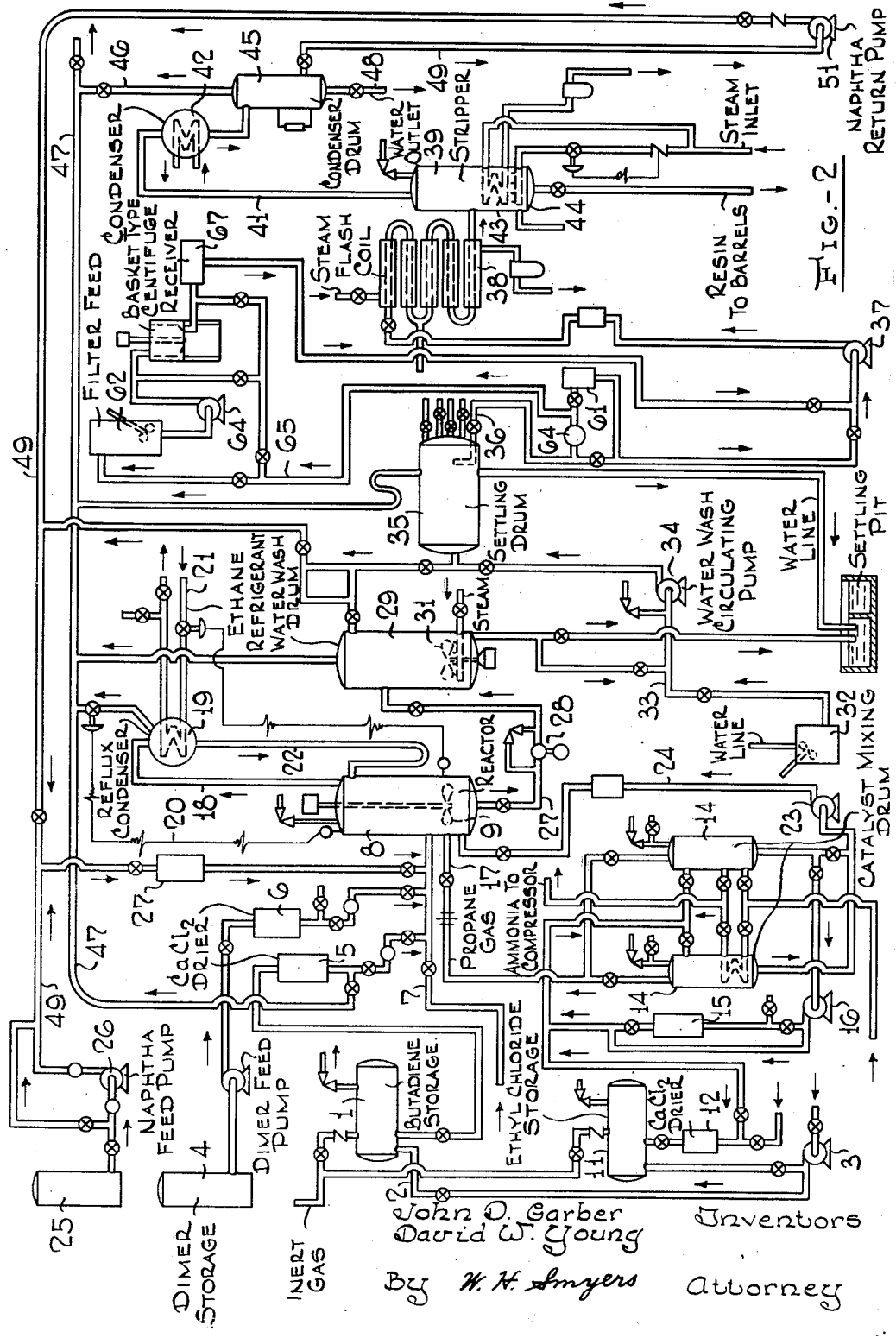
Figure 2 is a diagrammatic representation of apparatus for the polymerization, centrifugal clarification and flashing of the polymer solution.

Alternatively, the filter 63 may be replaced by a centrifuge as shown in Fig. 2. For this purpose the polymer may be delivered to the tank 35 and the water settled out as before described. The settling may be continued sufficiently long to settle out a major portion of the gel, or the settling tank 35 may be used merely to settle out traces of water. Then either the partially clarified supernatant liquid or the entire solution is sent to a centrifugal separator.

The centrifugal separator may preferably be a basket type, having an appropriate lining, such as a canvas bag into which the resin solution is delivered. The resin may be sent to the centrifuge directly from the settling tank 35 or an appropriate amount of filter aid may be incorporated in the solution as was done for the filtration process above described. It may be noted that a good centrifuge gives a much higher effective pressure and accordingly smaller amounts of filter aid may be used and a considerably higher filtration rate per square foot of filter surface may be obtained. Also the combination of larger basket, smaller quantities of filter aid and higher driving pressure permits clarification of considerably larger quantities of resin solution before it becomes necessary to suspend operations for the removal of the separated gel.

The clarifying material from the centrifuge may be delivered to a similar receiver 67 and then transferred to and through the finishing coil 38 by the pump 37 as above outlined. Alternatively a bowl type centrifuge of the cream separator type may be used by which a stream of highly clarified polymer solution is taken from the center outlet and a stream of solution containing

Table 1

| Filter Aid | Precoat | Filter Aid Conc., Weight Per Cent | Press. Drop, Lbs./sq. in. | Filter Rate, Gal./hr./sq. ft. | Char. of Filtrate |
|---|---|---|---|---|---|
| None | None | 0.0 | 13 | 0.1 | Clear. |
| Super Filtrol | None | 1.9 | 13 | 0.7 | Do. |
| Do | None | 3.8 | 13 | 1.6 | Do. |
| Do | None | 7.6 | 13 | 1.9 | Do. |
| Do | None | 15.2 | 13 | 5.4 | Do. |
| Hyflo Super-Cel | None | 1.9 | 13 | 1.0 | Do. |
| Do | None | 3.8 | 13 | 1.6/6.8 | Do. |
| Do | None | 7.6 | 13 | 1.9/13.7 | Do. |
| Do | None | 15.2 | 13 | 11.4 | Do. |
| Do | Yes | 0.0 | 13 | 1.4 | Do. |
| Do | Yes | 1.9 | 13 | 11.4 | Do. |
| Do | Yes | 3.8 | 13 | 6.8/22.7 | Do. |
| Do | Yes | 7.6 | 13 | 13.7/27.2 | Do. |
| Do | Yes | 15.2 | 13 | 45 | Do. |
| Filter Cel (+ charge) | Yes | 7.6 | 13 | 45 | Do. |

These results show a very great increase in filtration rate in the presence of the filter aid. In addition, the presence of the filtration aid greatly increased the number of gallons of polya relatively high concentration of gel is taken from the side outlet. These two streams are separately collected, the clarified stream being sent to the filtrate receiver 67 for flashing, the gel concentrate being discarded or mixed with filter aid and filtered by a procedure similar to that above outlined, if it is desired to recover all of the soluble polymers.

Alternatively, the polymer may be clarified by percolation through a filter bed as shown in Figure 3, in which case also it is preferably pre-settled to remove as much as possible of the gel, in the receiver 35 and the supernatant liquid is decanted off and passed through the percolating filter 71. This filter may contain a layer at the bottom of filter material 72 in the form of active clay or carbon black, or diatomaceous earth as desired. The polymer solution percolates through the filter layer and collects in the bottom of the filter tank 72 from which it is conveniently drained to a receiver 73. From the receiver 73, the clarified liquid is drawn by the pump 37 and delivered to the flash coil 38 as above outlined.

The concentrate of insoluble gel is useless for paint and varnish purposes. However, it contains a substantial amount of dissolved polymer. This polymer can be recovered by the steps of diluting the material whether it contains filter aid or not and refiltering. The percolating filter is readily stripped of substantially all of the soluble gel by the addition of substantial amounts of wash naphtha, and the material on the filter plates can also be freed substantially clear from soluble polymer by washing with naphtha. It is possible to use the high gel concentrate with or without the filter aid, as a molding composition, preferably with additional amounts of pigment or filter. For this purpose, such substances as lamp black, clay, whiting, barytes, zinc oxide, chrome green, chrome yellow, rouge, ground cork, wood flour, and the like may be added to produce a molding composition of the desired consistency which, in pressure molding, yields an excellent molded article, since the soluble polymer remaining is readily cross linked by heat into a hard, insoluble, infusible gel. In the preparation of such a molding composition it is usually desirable to add the additional pigment to the more or less fluid solvated gel, stir or mix to a homogeneous composition and then evaporate out the volatile solvent to leave behind unsolvated gel and solvent-free polymer since in this condition a better molding resin is obtained.

Thus the process of the invention polymerizes a mixture of mono olefin and multi olefin to a hard resin, while in solution, and removes from that solution all of the solvated, insoluble cross-linked material to leave a clear, sparkling, nearly white, solid resin by such steps as prolonged settling or filtering in the presence of a filter aid or by percolation filtration or by centrifuging; and yields as a by-product a mixture of gel, soluble resin, and pigment which is highly suitable for molding compositions.

While there are above disclosed but a limited number of embodiments of the process and apparatus of the present invention, it is possible to produce still other embodiments without departing from the inventive concept herein disclosed and it is therefore desired that only such limitations be imposed on the appended claims as are stated therein or required by the prior art.

The invention claimed is:

1. In a copolymerization process for the production of a clear, light-colored resin solution essentially free of cross-linked gel impurity, the steps in combination which comprise admixing from 30 to 80 parts by weight of butadiene with from 70 to 20 parts by weight of diisobutylene, diluting the mixture with liquid propane, cooling the mixture to a temperature within the range between $+10°$ C. and $-30°$ C., copolymerizing the resulting mixture by the addition thereto of a solution of a Friedel-Crafts catalyst comprising 3% by weight of aluminum chloride in solution in ethyl chloride, maintaining the reaction temperature within the range of $+10°$ C. to $-30°$ C. by continuous return of liquid propane reflux to the reaction mixture, whereby there is produced a solution of butadiene-diisobutylene copolymer in propane and unpolymerized monomers together with cross-linked gel impurity, admixing said solution of copolymer with sufficient solvent naphtha to produce a fluid solution, water-washing the resulting fluid solution to remove catalyst and neutralize the solution, settling the fluid solution to separate water and at least a part of cross-linked gel impurity from the solution of copolymer in solvent naphtha, separating the solution of copolymer in solvent naphtha, adding a filtering aid to said settled and decanted polymer solution, and filtering the settled and decanted polymer solution by the assistance of the filter aid to remove substantially all the remaining cross-linked gel impurity, whereby there is produced a clear copolymer solution having a Gardner color value of at least 7.

2. In a copolymerization process for the production of a clear, solid, light-colored resin essentially free of cross-linked gel impurity, the steps in combination which comprise admixing 55 parts by weight of butadiene with 45 parts by weight of diisobutylene, diluting the mixture with liquid propane, cooling the mixture to a temperature of approximately $-30°$ C., copolymerizing the resulting mixture by the addition thereto of a solution of a Friedel-Crafts catalyst comprising 3% by weight of aluminum chloride in solution in ethyl chloride, maintaining the reaction temperature at approximately $-30°$ C. by continuous return of liquid propane reflux to the reaction mixture, whereby there is produced a solution of butadiene-diisobutylene copolymer in propane and unpolymerized monomers together with cross-linked gel impurity, admixing said solution of copolymer with sufficient solvent naphtha to produce a fluid solution, water-washing the resulting fluid solution to remove catalyst and neutralize the solution, settling the fluid solution to separate water and at least a part of cross-linked gel impurity from the solution of copolymer in solvent naphtha, separating the solution of copolymer in solvent naphtha, adding a filtering aid to said settled and decanted polymer solution, filtering the settled and decanted polymer solution by the assistance of the filter aid to remove substantially all the remaining cross-linked gel impurity, and volatilizing the light solvent naphtha from the butadiene-diisobutylene copolymer by passing the filtered polymer solution through a heated pipe made of non-ferrous material, whereby there is produced a clear, solid copolymer having a Gardner color value of at least 7.

JOHN D. GARBER.
DAVID W. YOUNG.

(References on following page)

REFERENCES CITED

The following references are of record in the file of this patent:

UNITED STATES PATENTS

| Number | Name | Date |
|---|---|---|
| 1,982,708 | Thomas | Dec. 4, 1934 |
| 2,137,627 | Reed | Nov. 22, 1938 |
| 2,142,980 | Huijser | Jan. 3, 1939 |
| 2,216,094 | Britton | Sept. 24, 1940 |
| 2,258,268 | Sparks | Oct. 7, 1941 |
| 2,273,158 | Thomas | Feb. 17, 1942 |
| 2,356,128 | Thomas | Aug. 22, 1944 |
| 2,389,693 | Sparks | Nov. 27, 1945 |
| 2,476,000 | Sparks | July 12, 1949 |

OTHER REFERENCES

Thomas: Ind. Eng. Chem., 24, 1125–1128 October (1932).

Kolthoff and Sandell: "Textbook of Quantitative Inorganic Analysis"; page 316, Macmillan, N. Y. (1943).

Sebrell: Ind. Eng. Chem. 35, 739–40 July (1943).